Nov. 25, 1958     G. H. KRATZ     2,861,330
RETAINER APPLYING TOOL
Filed Dec. 20, 1956

George H. Kratz
INVENTOR.

United States Patent Office 2,861,330
Patented Nov. 25, 1958

2,861,330

RETAINER APPLYING TOOL

George H. Kratz, Brooklyn, N. Y.

Application December 20, 1956, Serial No. 629,646

1 Claim. (Cl. 29—275)

This invention relates to a tool for applying grease retainers, oil seals and the like into cavities in mechanical parts or onto shafts depending on the nature of the work that is being done.

An object of the present invention is to provide a tool which is constructed and arranged to apply a grease retainer or oil seal into its proper place with respect to a shaft or cavity or whatever place is intended to receive the oil seal or grease retainer, without damaging the seal or retainer. The nature of grease retainers and oil seals must, of necessity, be such that they deform when a force is applied thereon. Otherwise, they would not sreve their intended purpose effectively. Therefore, when applying such retainers or seals it often happens that they are damaged because of the weak construction thereof and the easily deformed walls making up the retainer or seal. The invention provides a tool which completely obviates the bending and local high pressure points that are normally encountered in tapping in or on such an oil seal or grease retainer by using ordinary tools. A large surface flush with the grease retainer or oil seal is at an end of the tool so that there are no local high pressure points, as would be the case in using a chisel, a hammer and a punch and since the contact area that the tool provides on the seal or retainer is as large as one side of the retainer or seal, there is no tendency in the seal to become warped or distorted in being applied onto the shaft or into the cavity depending on the type of work that is being done.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
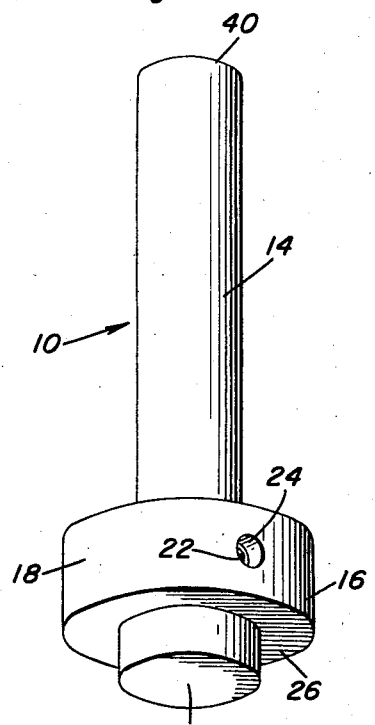
Figure 1 is a perspective view of a tool which is constructed in accordance with the invention.
Figure 2:
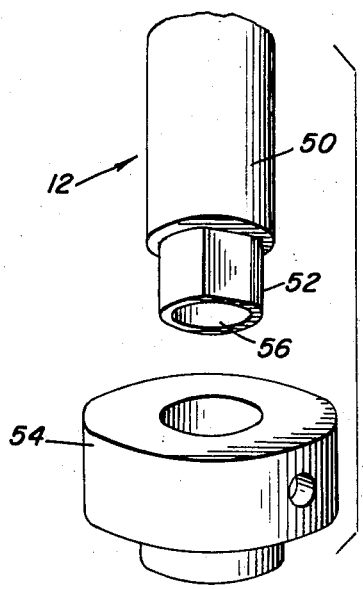
Figure 2 is an exploded perspective view of a modification of the tool in Figure 1.

In Figure 1 the tool 10 exemplifies the present invention as does the tool 12 in Figure 2. Tool 10 comprises a solid handle 14 which is preferably cylindrical and which has a head 16 at one end. The head comprises a disk 18 having a socket 20 opening through one face thereof and accommodating the extremity of handle 14. The extremity of the handle is held in place by means of a setscrew 22 threaded in the bore 24, the latter being radially formed in the head 16 and opening into socket 20.

The other face of a disk constituting a part of head 18 has an oil seal or grease retainer abutting, plane surface 26. A pilot 28 to fit in the central opening 30 of a typical grease retainer 32, is affixed to the surface 26 of head 16 and is cylindrical. For different sizes or types of oil seals or grease retainers, head 16 will be interchanged for another head of proper size and shaft to do the job.

Figure 4:
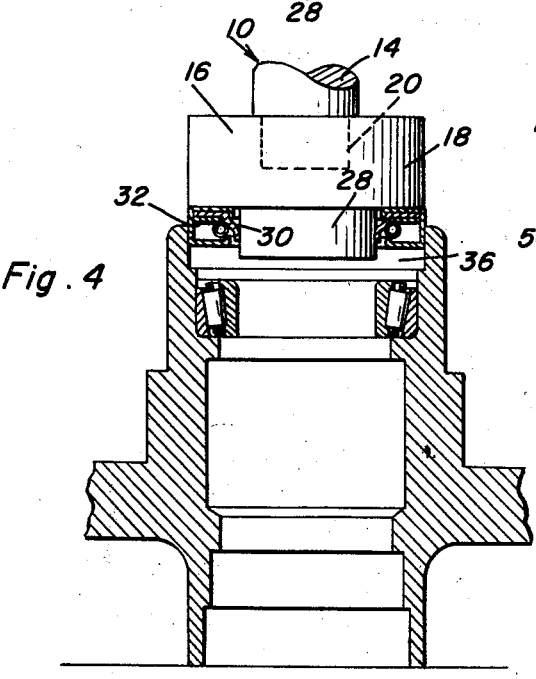
Figure 4 is a fragmentary elevational view of the tool in Figure 1 showing the same used in applying an oil seal into a motor vehicle hub.
Figure 3:
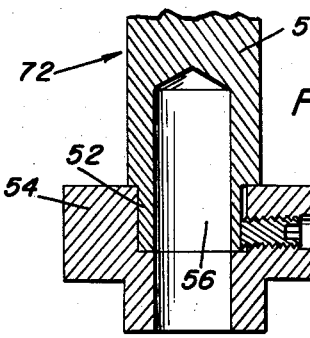
Figure 3 is a sectional view of the tool in Figure 2 showing the same when assembled.

As shown in Figure 4 the grease retainer or oil seal 32 is fitted on pilot 28 and the tool is then inserted in the cavity 36 which is to accommodate the oil seal 32. By tapping the hammer end 40 of the handle 14, the oil seal is gently and accurately slipped into the cavity 32 without distorting it or without in any way damaging the same.

The tool 12 is the same as the tool in Figure 1 except that handle 50 has a shank 52 of reduced cross section to shoulder on a part of one face 54 like the handle 14 and head 16, but there is a passageway 56 in the reduced shank 52 of handle 50 which aligns with an extension of that passage into the handle 50. This is to accommodate the end of a shaft, spindle or the like when a particular job at hand requires it, as inserting an oil seal in a differential, overdrive or some other part of a motor vehicle or any other mechanism. The remainder of the tool 12 is similar in function and construction to the tool 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A tool to insert an oil seal or grease retainer into a cavity or onto a shaft without damaging the seal or retainer, said tool comprising a substantially cylindrical handle, a substantially cylindrical head at one end of said handle, said head having an aperture therein for concentrically accommodating a portion of said handle, said portion comprising an extension of said handle and coaxial therewith, said extension having a flat surface thereon, said head having an internally threaded aperture therethrough for accommodating a setscrew to bear against said flat surface for detachably retaining said head and handle together, said head having a pilot coaxilly extending from said handle, said pilot having a passage therein for accommodating an end of the shaft while the seal or retainer is either being inserted in a cavity or on a shaft, and said head having a seal or retainer contacting surface protruding laterally from said pilot and adapted to fit flush against one surface of the seal or retainer.

References Cited in the file of this patent

UNITED STATES PATENTS

| | | |
|---|---|---|
| 1,483,670 | McKee et al. | Feb. 12, 1924 |
| 1,530,866 | Wakefield | Mar. 24, 1925 |
| 1,641,269 | Hoke | Sept. 6, 1927 |